United States Patent [19]

Greenheck

[11] 4,103,919
[45] Aug. 1, 1978

[54] LOAD CARRYING DOLLY WITH SECURED POST CASTERS

[76] Inventor: Robert R. Greenheck, 3053 S. Ivory Ct., Aurora, Colo. 80013

[21] Appl. No.: 803,475

[22] Filed: Jun. 6, 1977

[51] Int. Cl. ............................................. B62D 53/06
[52] U.S. Cl. ........................ 280/79.1 A; 248/DIG. 7
[58] Field of Search ...................... 280/79.1 R, 79.1 A, 280/79.2; 248/DIG. 7; 16/30, 37, 38, 39; 211/71

[56] References Cited

U.S. PATENT DOCUMENTS

| | | | |
|---|---|---|---|
| 973,029 | 10/1910 | Frosse | 280/79.1 A |
| 1,947,879 | 2/1934 | Sandberg | 248/DIG. 7 |
| 2,083,259 | 6/1937 | Ginter | 280/79.1 R |
| 2,321,981 | 6/1943 | Bowers | 280/79.1 A |
| 2,772,889 | 12/1956 | Reynolds | 16/30 |

*Primary Examiner*—Robert R. Song

*Attorney, Agent, or Firm*—Sheridan, Ross, Fields & McIntosh

[57] ABSTRACT

A load carrying dolly for supporting and transporting items such as trash receptacles comprises a thin generally planar base formed with a peripheral series of holes with guiding posts extending upward through the holes above the upper surface of the base to centrally locate the receptacle and prevent lateral displacement. A second series of holes is provided near the margin of the base and peripheral to the first series of holes to receive the sockets of post-type casters, with the upper ends of the sockets extending above the base. To prevent separation of the caster posts from the sockets as a result of rough handling, securing means are connected to the upper ends of the posts and are considerably larger than the inside diameter of the sockets so that the posts are prevented from being inadvertently displaced. The securing means can have a portion which restricts the flaring of the end of the sockets to prevent separation of the caster posts.

9 Claims, 9 Drawing Figures

U.S. Patent  Aug. 1, 1978  Sheet 1 of 2  4,103,919
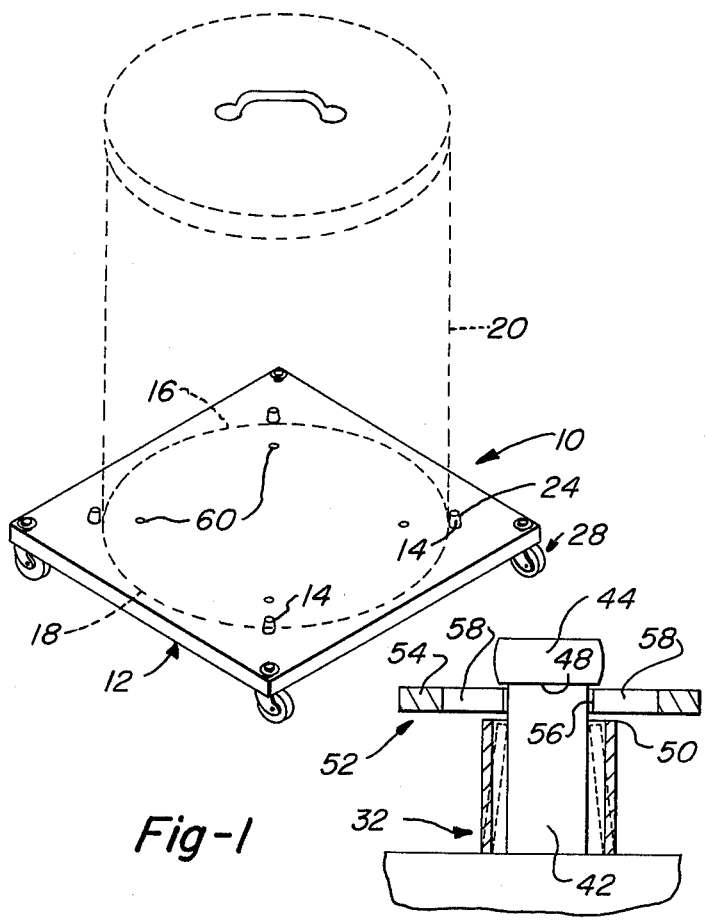
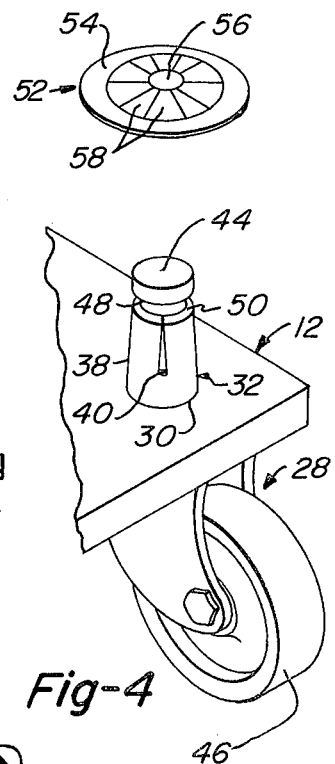
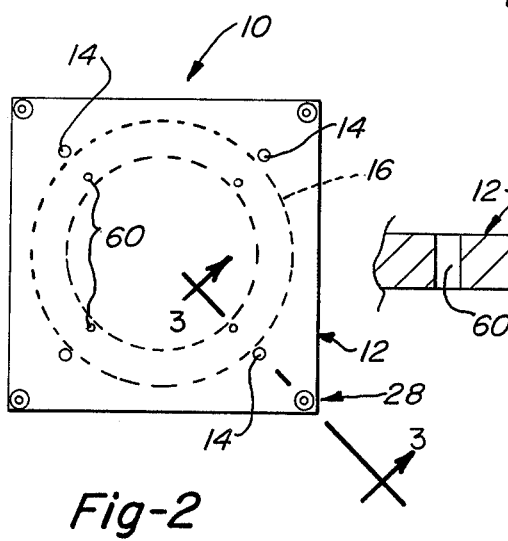
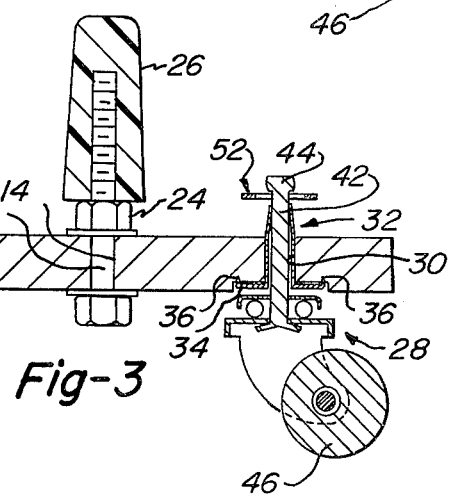

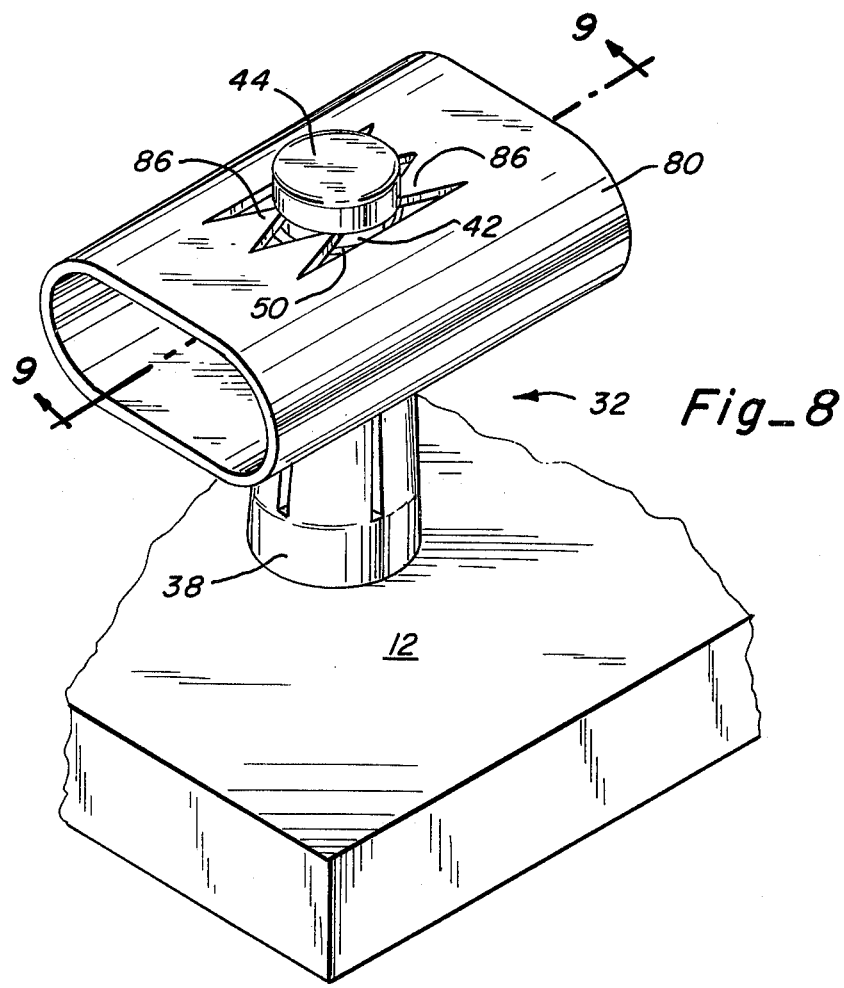
Fig_8
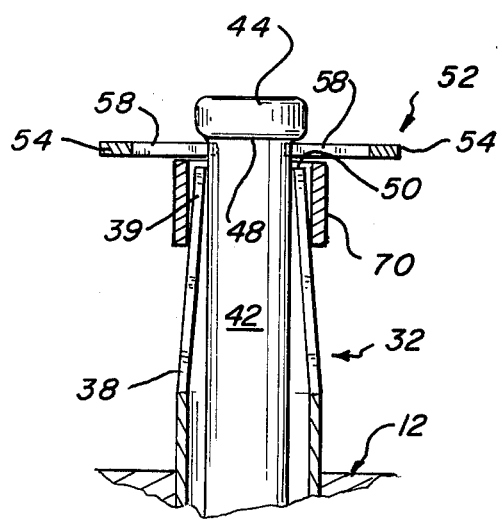
Fig_7
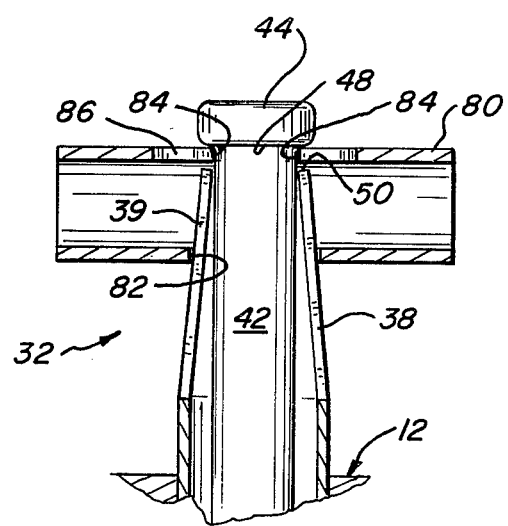
Fig_9

LOAD CARRYING DOLLY WITH SECURED POST CASTERS

BACKGROUND OF THE INVENTION

The present invention lies in the field of load carrying dollies and is directed to such a dolly which is provided with means for guiding a receptacle such as a garbage can to a generally central location on the base of the dolly and retaining it against lateral displacement to prevent tipping of the dolly and to prevent the receptacle from sliding off of the dolly base platform. It is further directed to the provision of casters which essentially cannot be disconnected from the base as a result of rough handling.

Conventional dollies for this purpose ordinarily consist of a simple base in the form of a generally rectangular board, crossed individual boards, or a piece of plywood from one half to one inch thick provided with three or more wheels or casters for mobility. Nothing is provided to initially locate the container on the base and nothing is provided to prevent it from sliding toward a margin of the base when the user pushes against the side of the container to cause the dolly to move in some desired direction. As the receptacle or container moves to the margin and possibly into an overhanging position the balance becomes precarious and the receptacle will readily slip off of the dolly base and/or tip and overturn if any substantial obstacle is encountered.

Platform type casters are usually applied to the under side of the base, such casters having a plate or platform which is placed against the base and secured to the base with a plurality of screws or bolts and nuts. While such casters are quite satisfactory, they are expensive and time consuming to mount since it is necessary to drill four holes in the base for each caster and to secure four screws or bolts in the holes.

Post type casters reduce the cost and effort required to install compared to platform type casters. It is necessary to drill only one hole in the base to mount such caster. The socket is driven into the hole and the post carrying the caster is pushed into the socket. The latter is usually formed with one or more slits in its upper portion and bent or crimped to form a taper. The post is provided with a flare or head at its upper end which is larger than the inside diameter of the upper end of the socket. As it is forced fully into place, the head spreads the end of the socket and snaps through, with the upper end of the socket closing again around the shank, and the post cannot readily be withdrawn. In the past, post casters have not been found practical in planar dolly base application. A post caster socket is designed to be inserted into an enclosed hole in a solid member since otherwise, if the top of the socket is exposed, it tends to enlarge with rough use, thereby allowing the post with caster to drop out of the socket. In this application, the socket is considerably longer than the thickness of the base and its upper portion extends above the top of the base and has no lateral support. Although the material is resilient enough to accommodate the initial assembly operation, it is still ductile enough to be gradually deformed by repeated forceful applications. Hence, as the caster repeatedly strikes obstacles in the course of use, the upper end of the post hammers lateraly at the upper portion of the socket. As a result the upper end of the socket gradually opens up until its inside diameter is larger than the flared head on the caster post, allowing the caster to become disassembled from its socket.

SUMMARY OF THE INVENTION

The difficulties mentioned above are overcome by the construction of the present invention which provides a simple and practical dolly having means to position and retain a receptacle and provided with casters which will not separated inadvertently from their sockets.

Generally stated, in its presently preferred form, the dolly includes a conventional base formed of planar material, such as synthetic or natural board or plywood and which is relatively thin. A first series of apertures pass through the base and are arranged in spaced relation around and slightly outward of a peripheral path corresponding to the planform of the base of a receptacle to be carried, such planform being of any shape but usually circular or rectangular. A guiding post passes upward through each aperture to a position above the surface of the base and serves to guide a receptacle into a generally central position on the base. The posts also serve to prevent the receptacle from moving laterally toward the margin to an unbalancing position.

A second series of apertures are formed through the base and spaced outwardly of the first series, preferably close to the margin. A tubular caster socket extends upward through each of these apertures with its upper portion exposed above the top of the base. This upper portion is formed with one or more longitudinal slits and bent inward to form a tapered section. A caster post provided with a caster at its lower end extends upward through the socket with its head above the upper edge and with the upper end of the socket closely surrounding the shank of the caster post. Since the caster post head is larger than the inside diamater of the socket at its upper edge, the post will not initially drop out. However, as the tapered upper end of the socket is gradually enlarged by rough usage, it will eventually be large in inside diameter than the outside diameter of the flared head of the caster post and then the post can drop out.

To prevent this possibility, a securing member which is substantially larger than the greatest possible inside diameter of the expanded socket is connected to the upper end of the caster post. In its presently preferred form the member is a resilient steel plate having fingers to engage the underside of the caster post head.

Additional series of apertures may be formed through the base inward of the first series and similarly arranged to accommodate smaller receptacles. The guiding posts may be moved from one series to another.

BRIEF DESCRIPTION OF THE DRAWINGS

Various other advantages and features of novelty will become apparent as the description proceeds in conjunction with the accompanying drawings, in which:

FIG. 1 is a perspective view of the dolly of the invention with its guiding posts and casters;

FIG. 2 is a plan view of the dolly of FIG. 1;

FIG. 3 is a sectional view taken on line 3—3 of FIG. 2;

FIG. 4 is an enlarged perspective view of the caster mounted in a base;

FIG. 5 is a perspective view of one form of securing member;

FIG. 6 is an enlarged view, partly in section, showing the expanded upper portion of the socket, with the securing member in place;

FIG. 7 is a partial side sectional view showing an additional caster securing arrangement of the present invention;

FIG. 8 is a perspective view of another caster post securing device; and

FIG. 9 is a partial side sectional view of the caster post securing device of FIG. 8.

DESCRIPTION OF PREFERRED EMBODIMENTS

The general arrangement of a dolly incorporating the features of the invention is schematically illustrated in FIGS. 1 and 2, in which the dolly 10 includes a base 12 of thin plywood or other material, preferably about three quarters of an inch thick, having a first series of apertures 14 therethrough arranged in spaced relation around and slightly outward of a peripheral path 16 corresponding to the planform of the base 18 of a receptacle 20 to be carried by the base. A guiding post, FIG. 3, in the form of a bolt 22 passes upward through each aperture and extends above the top of the base and is secured by a nut 24. A cap or shield 26 of plastic or other material is secured on the upstanding portion of the post. When the receptacle is to be placed on the base, the posts guide it to a generally central and most stable position as shown in FIG. 1 which is within the wheel base of the dolly. The guide posts also retain the receptacle against lateral movement toward or beyond the margin of the dolly base as it is pushed from place to place. The dolly is meant for use by a homeowner who is interested in avoiding lifting and in maintaining his receptacle in good condition. The shields 26 prevent damage of the bottom rim of the receptacle by preventing contact with the guiding posts.

A caster 28 is mounted close to the margin at each corner of the preferably rectangular base in a second outermost series of apertures 30. Each caster includes a tubular socket 32 having an anchor plate 34 at its lower end, the plate being equipped with marginal teeth 36 to be driven into the under side of the base. The socket is inserted upward through aperture 30 and teeth 36 are driven into the underside of the base. The upper tubular portion 38 of the socket extends a substantial distance above the base and this portion is formed with usually one or preferably two longitudinal slits 40, as seen in FIG. 4. The tubular portion is bent inward until the free edges of the slits are substantially in contact to form a taper as shown.

The caster includes a post comprising a shank 42 and a head 44 and carries a caster wheel 46 at its lower end. The caster post is surrounded by a freely moving base bearing, thereby allowing the caster post and wheel to rotate freely when resting against the anchor base of the caster socket. The post is mounted by pushing it upward through the socket until the head pushes the taper sections apart and snaps through to the position shown in FIG. 4. The parts are so dimensioned that the upper edge of the taper section fits closely but freely on shank 42 to allow rotation of the post. The head 44 is larger than the shank and larger than the inside diameter of the upper edge of the socket and defines with the shank a downwardly facing shoulder 48 which will normally contact the upper edge of the socket and prevent separation of the components. The normal gap between shoulder 48 and the upper edge 50 of the socket is very small to minimize vertical play between the socket and the post. For the purpose of this invention, this gap is enlarged to a value of the order of 0.100 to 0.125 inch.

As indicated in FIG. 6, constant lateral hammering of the upper portion of the socket by shank 42 in the course of rough usage as the caster wheels repeatedly strike obstacles gradually enlarges the upper shoulder of the socket from the broken line shape in which contact of shoulder 48 with edge 50 will prevent separation of the components to the solid line shape in which the inside diameter of the socket is larger than the head and will allow the post to drop out of the socket. To prevent this from happening, a securing member 52 is provided. While it may take other forms it is presently preferred to make the member in the form of a push nut as illustrated in FIG. 5. It is in the form of a slightly concave resilient metal plate 54, such as spring steel having a generally central aperture 56 to fit on shaft 42, with a plurality of spring fingers 58 radiating outward from the aperture and fixed to the plate and aligned in such a way as to maintain itself nearly centered around shaft 42 when applied and therefore nearly centered above the upper edge of the caster socket shoulder 50.

To mount member 52 in place it is centered over head 44 and pushed downward. The fingers spring out to pass the enlargement of the post head and then snap into the gap between shoulder 48 and edge 50 to lock the member in position to serve as an abutment. Since its lateral extent is much greater than the maximum inside diameter of the socket, there is essentially no possibility of inadvertent separation of the caster post from its socket. To insure ease of assembly the thickness of member 52 is made slightly less than the vertical extent of the gap between shoulder 48 and edge 50. Such clearance is preferably of the order of 0.100 inch. Because of this clearance, member 52 may grip shank 42 without preventing free rotation of the post in the socket. The ultimate clearance between the underside of securing member 52 and the upper edge of the shoulder 48 of the socket is minimal, however, to minimize vertical play of the caster post in its socket. If desired, the diameter of aperture 56 may be from five to ten thousandths of an inch greater than the diameter of shank 42 to allow member 52 to rotate freely on the shank.

In FIG. 7, an additional feature which can be used with the securing member 52 is shown. A short piece of seamless tubing 70 is provided which has an inside diameter which will fit snugly over the taper section 39 of the socket 38. The tubing 70 can be as short as practical but probably no less than 3/16 inch. This tubing or ring 70 holds the tapered ends of the socket in proper position and prevents the expansion or spreading of the end of the socket during use. As an alternative, a washer with a center hole having a suitable diameter could be substituted for the tubing 70.

Another embodiment for the caster post securing member is shown in FIGS. 8 and 9. As explained above, the caster post is mounted by pushing the head 44 through socket 32 until it clears the end or upper shoulder 50 of the tubular portion 38. The length of the shank 42 is arranged to provide a gap between shoulder 48 and the socket upper edge 50. A securing member 80 which can be bent to shape from flat spring stock or formed from a short length of partially flattened tubing is provided which can be pushed down over the caster post to hold it in proper position. An aperture 82 having a diameter which is larger than the caster post head 44 and yet fits the nominal outside dimension of the tapered portion 39 of the socket is formed in one of the flat surfaces of the member 80. Aligned with the aperture 82 and found in the opposite spaced flat surface is a second aperture 84. This aperture is defined by the ends of a plurality of flexible fingers formed by cutting away portions of the surface. The diameter of the aperture 84 is less than aperture 82 and is sized to loosely fit the shank 42 but retain the post head 44.

The generally flat surfaces of the member 80 are substantially parallel and spaced an appropriate distance to position the two apertures 82, 84. Although it may be desirable to allow the caster post to rotate freely in the socket, it is possible to lightly tension the post to eliminate vertical play by increasing slightly the distance or spacing of the surfaces of members 80 in its free or uninstalled condition. Thus, when installed the sides of the aperture 82 will reset on the tapered sides of the socket with the fingers 86 held in light contact with the shoulder 48.

Various other arrangements for the securing member may be provided. One such arrangement could have a tubular or cylindrical configuration with the finger aperture formed in one end with the sides extending downward around the tapered socket. The bottom edges of the sides could be flared outward to rest on the surface of the dolly base. Various U-shaped clips having slots and/or apertures could be used.

Additional series of apertures 60 may also be provided in the base. They are located inward of the first series and similarly spaced around and slightly outward of a peripheral path corresponding to the planform of the base of a smaller receptacle. Guiding posts 22 may be mounted in these apertures as desired to fit varying shapes and sizes of containers.

What is claimed is:

1. A load carrying dolly comprising:
   a thin generally planar base provided with a first series of apertures passing therethrough and arranged in spaced relation around and slightly outward of a peripheral path corresponding to the planform of the base of a receptacle to be carried by the dolly;
   a guiding post passing through each aperture and extending above the surface of the base to guide a selected receptacle into a predetermined position on the base;
   a second series of apertures passing through the base and spaced outwardly of the first series;
   a tubular caster socket extending upward through each aperture of the second series to a level substantially above the upper surface of the base;
   a caster post provided with a caster at its lower end and extending upward through each socket;
   and securing means connected to the upper end of each caster post to retain the post in the socket without restricting rotation of the caster post and prevent inadvertent disengagement therefrom.

2. A dolly as claimed in claim 1; in which
   a protective shield is provided on each guiding post for engagement with the receptacle base to prevent damage thereto.

3. A dolly as claimed in claim 1; in which
   one or more additional series of apertures are formed through the base; and
   the additional series are located inward of the first series and arranged in spaced relation around and slightly outward of a peripheral path corresponding to the planform of the base of receptacles having smaller lateral dimensions than those of the receptacle accommodated by the first series of apertures and guiding posts.

4. A load carrying dolly comprising:
   a thin generally planar load supporting base provided with a series of apertures passing therethrough at spaced positions about its periphery;
   a tubular caster socket extending upward through each aperture to a level substantially above the surface of the base;
   a caster post provided with a caster at its lower end and extending upward through each socket;
   and securing means connected to the upper end of each post to rotatably retain the post in the socket and prevent inadvertent disengagement therefrom.

5. A dolly as claimed in claim 4; in which
   the upper portion of each socket is tapered and is subject to substantial enlargement of its inside diameter under rough useage;
   and a caster post securing means that has a lateral dimension substantially greater than the maximum possible enlargement of the inside diameter of the upper portion of the socket.

6. A load carrying dolly as defined in claim 4; in which
   the securing means is formed from a resilient material and has fingers to engage the top end of the caster post.

7. A load carrying dolly as claimed in claim 4; in which
   the securing means is a plate of resilient material having a generally central, slightly concave area with an aperture therein sized to surround the upper end of the caster post and said aperture is defined by the inner ends of a plurality of fingers radiating inward toward the aperture and fixed to the plate at their outer ends.

8. A load carrying dolly as claimed in claim 4; in which
   the upper end of the caster post has a shoulder formed therein and the length of the caster post is arranged to provide a gap between the shoulder of the caster post and the upper end of the socket, the gap is within the range of 0.100 to 0.125 inches; and
   the thickness of the securing means is less than the extent of the gap by an amount sufficient to allow it to fit loosely in the gap to permit caster post rotation but thick enough to prevent excessive vertical movement of the caster post within its socket.

9. A load carrying dolly as claimed in claim 4; in which
   the securing means includes a second portion which engages the sides of the tubular socket to prevent expansion of the upper end and disengagement of the caster post from the socket.

* * * * *